United States Patent
Imamura et al.

(10) Patent No.: US 8,170,136 B2
(45) Date of Patent: May 1, 2012

(54) RADIO TRANSMITTING APPARATUS AND RADIO TRANSMITTING METHOD

(75) Inventors: Daichi Imamura, Kanagawa (JP); Takashi Iwai, Ishikawa (JP); Atsushi Matsumoto, Ishikawa (JP); Sadaki Futagi, Ishikawa (JP); Tomofumi Takata, Ishikawa (JP)

(73) Assignee: Panasonic Corporation, Osaka (JP)

( * ) Notice: Subject to any disclaimer, the term of this patent is extended or adjusted under 35 U.S.C. 154(b) by 752 days.

(21) Appl. No.: 12/095,460

(22) PCT Filed: Nov. 30, 2006

(86) PCT No.: PCT/JP2006/323923
§ 371 (c)(1),
(2), (4) Date: Feb. 10, 2009

(87) PCT Pub. No.: WO2007/063937
PCT Pub. Date: Jun. 7, 2007

(65) Prior Publication Data
US 2009/0161789 A1    Jun. 25, 2009

(30) Foreign Application Priority Data
Dec. 1, 2005  (JP) ................. 2005-347997

(51) Int. Cl.
*H04L 27/00*    (2006.01)
(52) U.S. Cl. ........ 375/295; 375/296; 375/260; 375/299; 375/267; 375/347; 375/349
(58) Field of Classification Search ................. 375/295, 375/296, 299, 260, 267, 347, 349
See application file for complete search history.

(56) References Cited

U.S. PATENT DOCUMENTS

| 6,289,045 | B1 | 9/2001 | Hasegawa |
| 6,993,092 | B1 | 1/2006 | Murakami |
| 2005/0157639 | A1* | 7/2005 | Song et al. ............. 370/208 |
| 2006/0018411 | A1* | 1/2006 | Gore et al. ............. 375/340 |

FOREIGN PATENT DOCUMENTS

| JP | 11-220450 | 8/1999 |
| JP | 2000-22600 | 1/2000 |
| JP | 2003-142636 | 5/2003 |
| JP | 2004-328793 | 11/2004 |
| WO | 2004/014008 | 12/2004 |

OTHER PUBLICATIONS

Falconer, et al. "Frequency Domain Equalization for Single-Carrier Broadband Wireless Systems," IEEE Communications Magazine, pp. 58-66, Apr. 2002. International Search Report dated Dec. 26, 2006.
Japanese Office Action dated Jan. 4, 2012.

*Primary Examiner* — Kabir A Timory
(74) *Attorney, Agent, or Firm* — Dickinson Wright PLLC

(57) ABSTRACT

Disclosed are a radio sending device and a radio sending method for improving a throughput while keeping a receiving quality. In this radio sending device, an MCS switching control unit (102) applies an MCS parameter having a lower quality required than that of the MCS parameter to be applied to send data arranged at other than the two end portions of a block, to send data arranged at the two end portions of the block, and a CP adding unit (105) adds such a CP to the leading end of the block as is created by copying the trailing end portion of the block composed of the send data, to which the MCS parameter is applied by the MCS switching control unit (102), with a length less than the delay time of the maximum delay wave. A send RF unit (106) sends the send data, in which the CP is added to the leading end of the block, from an antenna (107).

15 Claims, 13 Drawing Sheets

| TRANSMISSION MCS VALUE | ROBUST MCS VALUE | NUMBER OF BEGINNING ROBUST MCS SYMBOLS (K) | NUMBER OF TAIL ROBUST MCS SYMBOLS (L) |
|---|---|---|---|
| 64QAM | 16QAM | 16 | 16 |
| 16QAM | QPSK | 16 | 16 |
| 8PSK | BPSK | 16 | 16 |
| QPSK | | 16 | 16 |

FIG.3

| TRANSMISSION MCS VALUE | FIRST ROBUST MCS VALUE | SECOND ROBUST MCS VALUE | NUMBER OF FIRST ROBUST MCS VALUE SYMBOLS | NUMBER OF SECOND ROBUST MCS VALUE SYMBOLS |
|---|---|---|---|---|
| 64QAM | 32QAM | 16QAM | 8 | 8 |
| 16QAM | 8PSK | QPSK | 8 | 8 |
| 8PSK | QPSK | BPSK | 8 | 8 |
| BPSK | BPSK | | 8 | |

FIG.8

| TRANSMISSION MCS VALUE | ROBUST MCS VALUE | NUMBER OF BEGINNING ROBUST MCS SYMBOLS (K) | NUMBER OF TAIL ROBUST MCS SYMBOLS (L) |
|---|---|---|---|
| 64QAM | 16QAM | 32 | 32 |
| 16QAM | QPSK | 16 | 16 |
| 8PSK | BPSK | 8 | 8 |
| QPSK | | 4 | 4 |

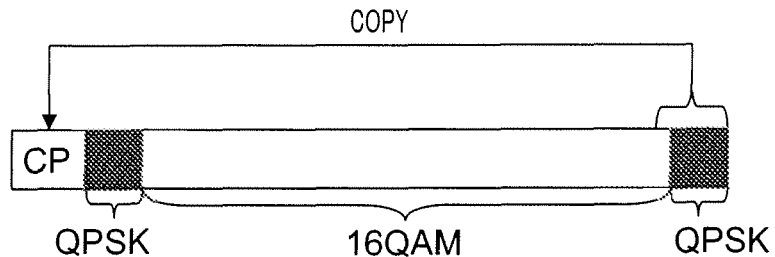
FIG.13A
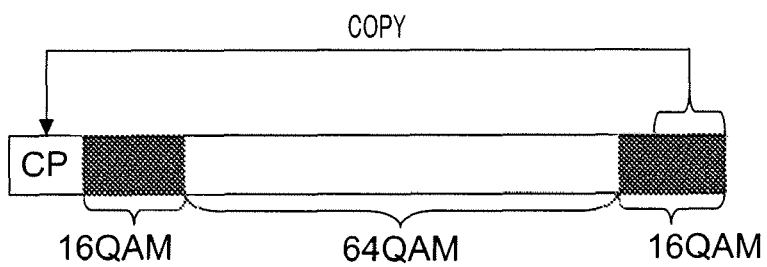
FIG.13B
| DIFFERENCE IN REQUIRED SINR BETWEEN TRANSMISSION MCS VALUE AND ROBUST MCS VALUE | TRANSMISSION MCS VALUE | ROBUST MCS VALUE | NUMBER OF BEGINNING ROBUST MCS SYMBOLS (K) | NUMBER OF TAIL ROBUST MCS SYMBOLS (L) |
|---|---|---|---|---|
| LARGE | 64QAM | QPSK | 16 | 16 |
| ↕ | 16QAM | QPSK | 16 | 16 |
| | 8PSK | QPSK | 16 | 16 |
| SMALL | QPSK | QPSK | 16 | 16 |
FIG.14

RADIO TRANSMITTING APPARATUS AND RADIO TRANSMITTING METHOD

TECHNICAL FIELD

The present invention relates to a radio transmitting apparatus and a radio transmitting method that carry out frequency domain equalization single carrier transmission.

BACKGROUND ART

As an uplink radio access scheme of a next-generation communication system, studies are being conducted for a frequency domain equalization single carrier transmission scheme (SC-FDE: Single Carrier with Frequency Domain Equalization) using CP (Cyclic Prefix). In the frequency domain equalization single carrier transmission scheme, data symbols assigned in the time domain are transmitted with a single carrier.

A technique is disclosed in Non-Patent Document 1, as one of frequency domain equalization single carrier transmission systems. This technique will be explained below.

The transmission system disclosed in Non-Patent Document 1 generates a signal by attaching a CP, which is a copy of a predetermined portion at the tail end of a data block, to the beginning of the data block (see FIG. 1). The length of the attached CP is set to be longer than a propagation delay difference between terminals transmitting signals simultaneously at different frequencies and delayed waves occurred in a multi-path channel. This is because when there is a delayed wave exceeding the CP length, interference occurs between FFT (Fast Fourier Transform) blocks, which are FFT processing units (hereinafter "IBI (Inter Block Interference)") and received signal quality degrades.

The single carrier signal with a CP attached as such is transmitted from a transmitting apparatus, the direct wave and a delayed wave are combined in a channel and the combined signal arrives at a receiving apparatus. The receiving apparatus performs timing synchronization processing on the received signal and extracts a 1 block length signal from the beginning of a block of the direct wave. The extracted signal includes the direct wave component, a delayed wave component and a noise component at the receiving apparatus and is combined with these components. The extracted signal is subjected to equalization processing on waveform distortion in the frequency domain (frequency domain equalization) and demodulated.

Non-Patent Document 1: Falconer, D.; Ariyavisitakul, S. L.; Benyamin-Seeyar, A.; Eidson, B, "Frequency domain equalization for single-carrier broadband wireless systems," Communications Magazine, IEEE, Volume 40, Issue 4, pp 58 to 66, April 2002.

DISCLOSURE OF INVENTION

Problems to be Solved by the Invention

However, the technique described in Non-Patent Document 1 above has a problem that the CP overhead increases and the transmission efficiency deteriorates. More specifically, when IBI that is anticipated is reduced only using the CP, the CP length is set to be long enough, to an extent that IBI can be ignored in accordance with the cell radius (service radius) estimated by the system and a channel environment. For this reason, the CP overhead increases and the transmission efficiency deteriorates. On the other hand, when the CP length is shortened to reduce the deterioration of the transmission efficiency, IBI can no longer be ignored and received signal quality degrades.

It is therefore an object of the present invention to provide a radio transmitting apparatus and a radio transmitting method that can maintain received signal quality and improve throughput.

Means for Solving the Problem

The radio transmitting apparatus according to the present invention adopts a configuration including: a modulation and coding scheme switching control section that applies a modulation and coding scheme parameter of lower required quality than a modulation and coding scheme parameter showing a combination of a coding rate and modulation scheme applied to transmission data assigned to a part other than an end of a block as a processing unit of time-frequency conversion out of transmission data assigned in the block to transmission data assigned to the end part of the block; a encoding section that encodes the transmission data according to the modulation and coding scheme parameter applied by the modulation and coding scheme switching control section; a modulation section that modulates the transmission data according to the modulation and coding scheme parameter applied by the modulation and coding scheme switching control section; a CP attaching section that attaches a cyclic prefix generated by copying a tail part of the block to a length less than a delay time of a maximum delayed wave, to a beginning of the block; and a transmission section that transmits the transmission data with the cyclic prefix attached to the beginning of the block.

The radio transmitting method of the present invention includes a modulation and coding scheme switching control step of applying a modulation and coding scheme parameter of lower required quality than a modulation and coding scheme parameter showing a combination of a coding rate and modulation scheme applied to transmission data assigned to a part other than an end part of a block as a processing unit of time-frequency conversion out of transmission data assigned in the block to transmission data assigned to the end part of the block; a CP attaching step of attaching a cyclic prefix to a beginning of the block, the cyclic prefix generated by copying the tail part of the block provided with the transmission data where the modulation and coding scheme parameter is applied, to a length less than a delay time of a maximum delayed wave; and a transmission step of transmitting transmission data with the cyclic prefix attached to the beginning of the block.

ADVANTAGEOUS EFFECT OF THE INVENTION

According to the present invention, it is possible to maintain received signal quality and improve throughput.

BRIEF DESCRIPTION OF DRAWINGS

FIG. 3 is an example of a table in the MCS/symbol number storage section shown in FIG. 2;

FIG. 8 shows an example of a table stored in the MCS/symbol number storage section of the transmitting apparatus according to Embodiment 2 of the present invention;

FIG. 13A illustrates transmission data generated by the transmitting apparatus according to Embodiment 3 of the present invention;

FIG. 13B illustrates transmission data generated by the transmitting apparatus according to Embodiment 3 of the present invention;

FIG. 14 shows an example of a table in the MCS/symbol number storage section of the transmitting apparatus according to Embodiment 4 of the present invention;

BEST MODE FOR CARRYING OUT THE INVENTION

Embodiments of the present invention will be described below in detail with reference to the accompanying drawings.

Embodiment 1

Figure 1:
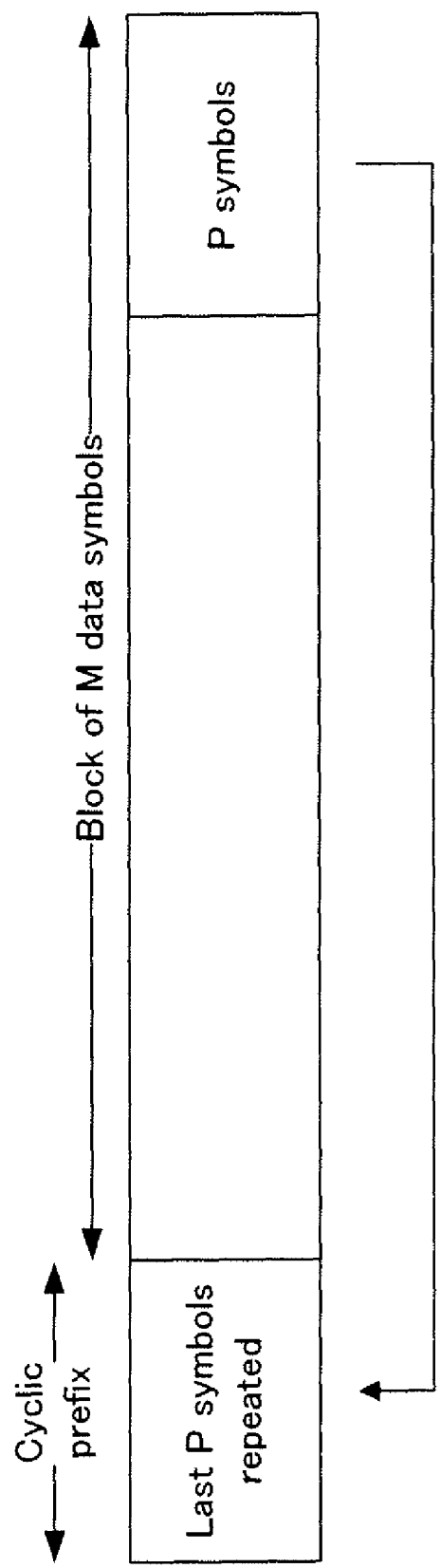
FIG. 1 shows a method of generating a CP.
Figure 2:
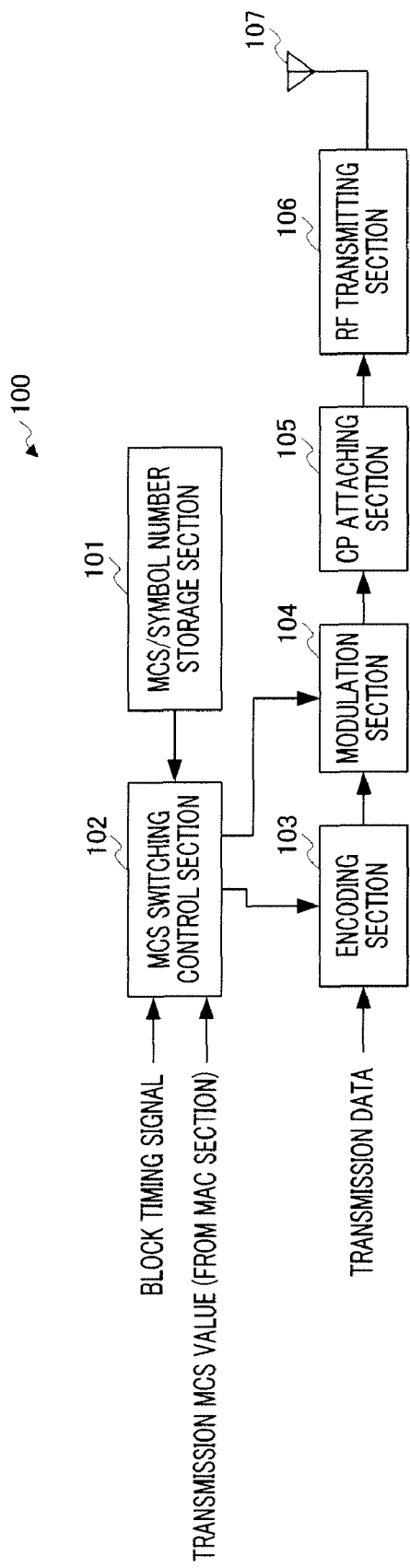
FIG. 2 is a block diagram showing a configuration of the transmitting apparatus according to Embodiments 1 to 4 of the present invention.

FIG. 2 is a block diagram showing the configuration of transmitting apparatus 100 according to Embodiment 1 of the present invention. In this figure, MCS/symbol number storage section 101 stores a table, which associates the modulation schemes (robust MCS values) for the symbols at both end parts of a block with the numbers of symbols (numbers of robust MCS symbols) where the robust MCS values are applied, for each modulation scheme shown by a transmission MCS value of a data part except both end parts of the block which is a processing unit of time-frequency conversion represented by FFT (Fast Fourier Transform). MCS/symbol number storage section 101 outputs the robust MCS value and the number of robust MCS symbols to MCS switching control section 102 in reply to a query from MCS switching control section 102. Details of MCS/symbol number storage section 101 will be described later.

MCS switching control section 102 acquires the robust MCS value and the number of robust MCS symbols corresponding to the transmission MCS value outputted from a MAC section (not shown) from MCS/symbol number storage section 101. MCS switching control section 102 outputs a modulation control signal showing a modulation scheme such as QPSK, 16QAM and 64QAM at timing based on the acquired number of symbols and a separately acquired block timing signal to modulation section 104 and outputs a coding rate to encoding section 103.

Encoding section 103 performs error correcting encoding processing on transmission data according to the coding rate outputted from MCS switching control section 102 and outputs the encoded transmission data to modulation section 104.

Modulation section 104 acquires the modulation control signal outputted from MCS switching control section 102, performs modulation processing on the transmission data outputted from encoding section 103 according to the modulation scheme shown by the acquired modulation control signal to generate transmission symbols. The transmission symbols are outputted to CP attaching section 105.

CP attaching section 105 generates a CP by making a copy of the tail part of a block in which the transmission symbols outputted from modulation section 104 are assigned, by a length less than a delay time of the maximum delayed wave and attaches the generated CP to the beginning of the block. The signal with the CP is outputted to RF transmitting section 106. The CP length may be equal to or more than zero and less than the maximum delay time and this causes inter-block interference (IBI) is likely to occur.

RF transmitting section 106 performs predetermined radio transmission processing such as D/A conversion, amplification and up-conversion on the signal outputted from CP attaching section 105 and transmits the signal after the radio transmission processing from antenna 107 to receiving apparatus 200.

FIG. 3 shows an example of a table stored in MCS/symbol number storage section 101 shown in FIG. 2. As shown in this figure, the transmission MCS value 64QAM is associated with the robust MCS value 16QAM. Furthermore, the transmission MCS value 16QAM is associated with the robust MCS value QPSK. Furthermore, the transmission MCS values 8PSK and QPSK are associated with the robust MCS value BPSK. To all transmission MCS values, 16 symbols are assigned respectively as the number of robust MCS symbols at the beginning and the tail. In this way, robust MCS values are associated with modulation schemes having lower M-ary numbers than transmission MCS values. In the example of FIG. 3, the number of symbols of the block is 32 or more.

Figure 4:
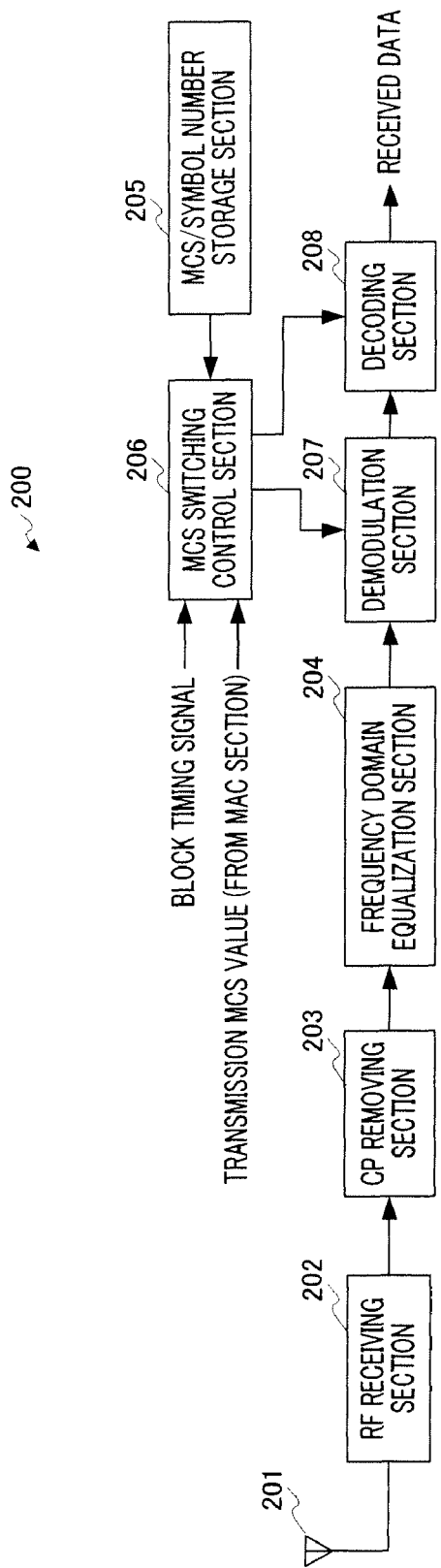
FIG. 4 is a block diagram showing a configuration of the receiving apparatus according to Embodiments 1 to 4 of the present invention.

FIG. 4 is a block diagram showing the configuration of receiving apparatus 200 according to Embodiment 1 of the present invention. In this figure, RF receiving section 202 receives a signal transmitted from transmitting apparatus 100 shown in FIG. 2 through antenna 201 and performs predetermined radio reception processing such as down-conversion, A/D conversion on the received signal. The signal after the radio reception processing is outputted to CP removing section 203.

CP removing section 203 removes the CP from the signal outputted from RF receiving section 202 based on synchronization timing and outputs the signal removing the CP to frequency domain equalization section 204.

Frequency domain equalization section 204 converts the signal outputted from CP removing section 203 to a frequency domain signal using time-frequency conversion processing such as FFT, and compensates distortion by equalizing the signal in the frequency domain (frequency domain equalization). The signal equalized in the frequency domain is converted to a time domain signal and outputted to demodulation section 207.

MCS/symbol number storage section 205 stores the same table as that stored in MCS/symbol number storage section 101 shown in FIG. 2, that is, the table shown in FIG. 3. MCS/symbol number storage section 205 outputs a robust MCS value and the number of robust MCS symbols to MCS switching control section 206 in reply to a query from MCS switching control section 206.

MCS switching control section 206 acquires the robust MCS value and number of robust MCS symbols corresponding to the transmission MCS value outputted from a MAC section (not shown) from MCS/symbol number storage section 205. MCS switching control section 206 outputs a modulation control signal showing a modulation scheme such as QPSK, 16QAM and 64QAM to demodulation section 207 at timing based on the number of acquired symbols and a separately acquired block timing signal and outputs a coding rate to decoding section 208.

Demodulation section 207 makes a signal constellation point decision on the received symbols outputted from frequency domain equalization section 204 according to the modulation scheme shown by the modulation control signal outputted from MCS switching control section 206 and outputs the decision result to decoding section 208. Decoding section 208 performs decoding processing (error correcting decoding processing) according to the coding rate outputted from MCS switching control section 206 and acquires received data.

Figure 5:
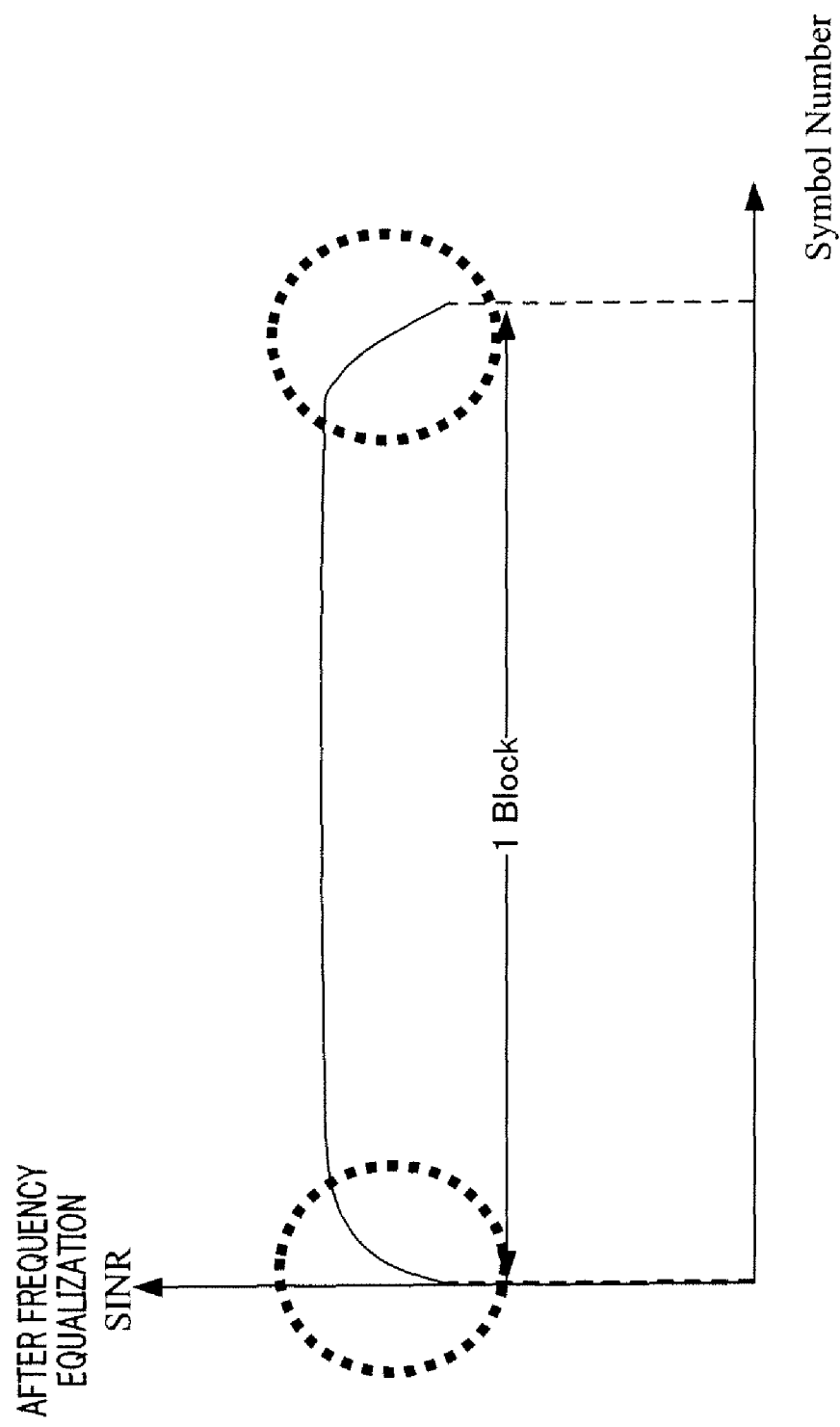
FIG. 5 shows an SINR for each symbol after frequency domain equalization.

Here, when there is a delayed wave exceeding the CP, SINR (Signal to Interference and Noise Ratio) for each symbol after the frequency domain equalization is as shown in FIG. 5. That is, when there is a delayed wave exceeding the CP, IBI occurs, and SINR at both end parts of the block affected by IBI significantly degrades, whereas SINR in the vicinity of the center except both end parts degrades less.

Suppose "both end parts of the block" refers to a range (range surrounded by a dotted circle in FIG. 5) in which SINR of symbols after frequency domain equalization degrades and drops due to IBI obtained beforehand through an evaluation according to an estimated path model (e.g., PA, PB, VA or TU model) or propagation delay difference between UEs (e.g., transmission timing control error).

Figure 6:
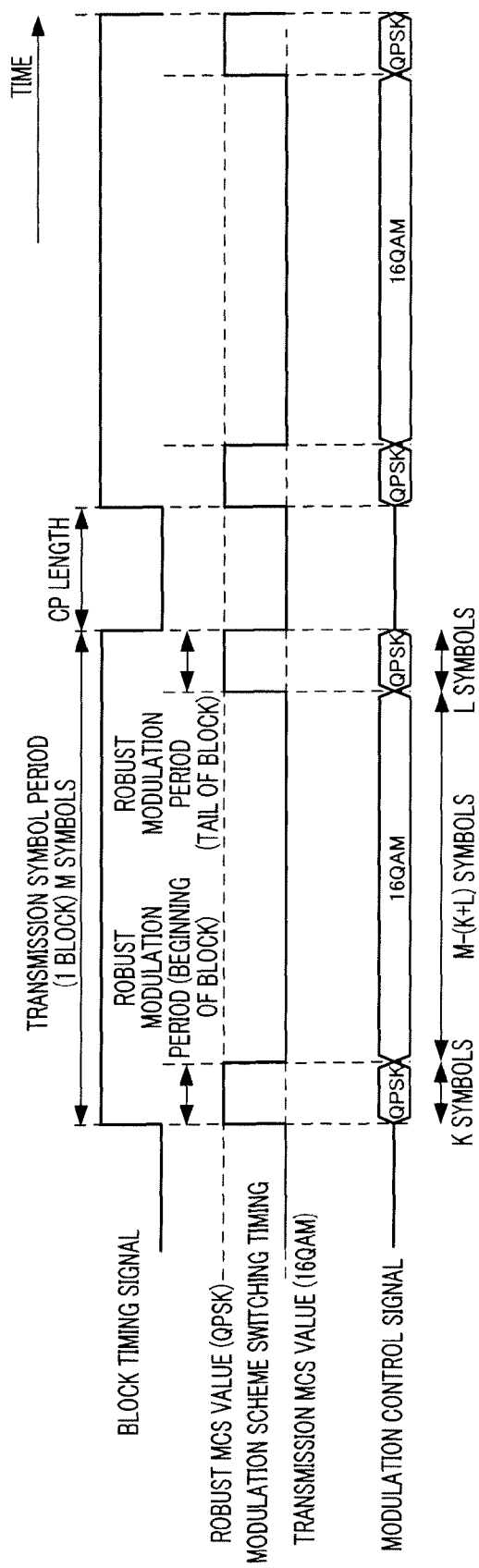
FIG. 6 is a timing chart showing a generating process of a modulation control signal when a transmission MCS value is 16QAM.

Next, the operations of MCS switching control section 102 shown in FIG. 2 will be explained. FIG. 6 is a timing chart showing a generating process of a modulation control signal when a transmission MCS value is 16QAM. Suppose the coding rate is set to an arbitrary fixed value.

The transmission MCS value outputted from the MAC section is 16QAM, and MCS switching control section 102 acquires the robust MCS value QPSK and the number of robust MCS symbols 16 at the beginning and the tail which correspond to the transmission MCS value of 16QAM from MCS/symbol number storage section 101. MCS switching control section 102 then generates a modulation control signal showing QPSK of the robust MCS value with respect to the number of robust MCS symbols from the beginning, that is, 16 symbols from the beginning of the block from the time when the block timing signal rises.

MCS switching control section 102 then generates a modulation control signal showing 16QAM of the transmission MCS value with respect to the data part other than symbols at both ends to which the robust MCS value is applied and generates a modulation control signal showing QPSK of the robust MCS value with respect to the number of robust MCS symbols from the tail of the block, that is, 16 symbols from the tail of the block.

Figure 7:
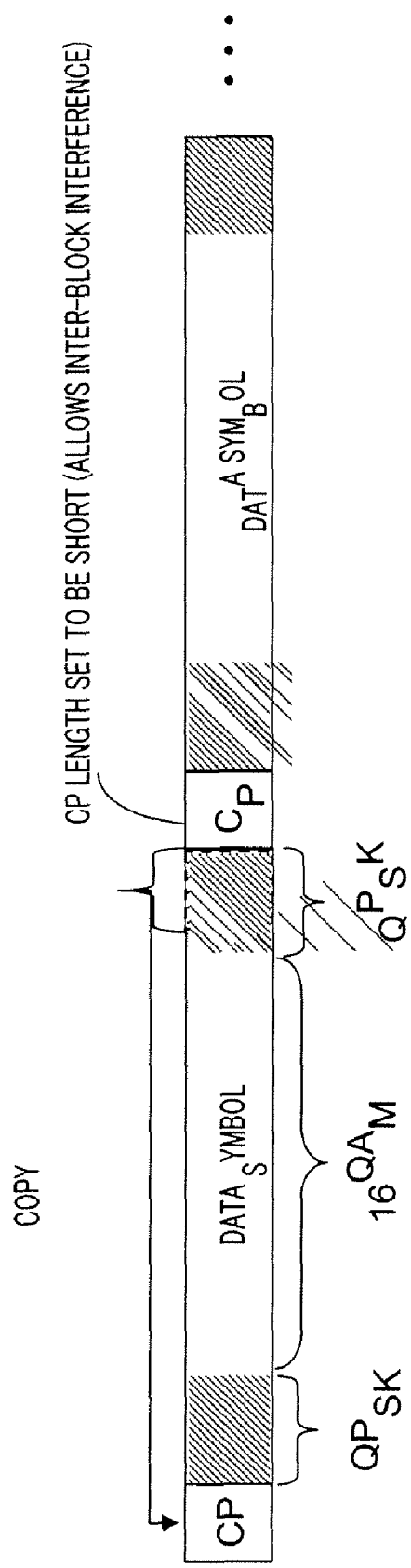
FIG. 7 shows transmission data generated by the transmitting apparatus shown in FIG. 2.

The block timing signal falls during the period showing the CP length, and MCS switching control section 102 stops generating a modulation control signal during this period. The transmission data as shown in FIG. 7 is generated as such and it is possible to reduce degradation of received signal quality at both end parts of the block due to IBI. Furthermore, a conversion algorithm represented by, for example, Fourier transform, Wavelet transform and multi-rate filter bank can be used for time-frequency conversion.

In this way, according to Embodiment 1, a CP length is set less than a multi-path maximum delay time, and the MCS applied to symbols at both end parts of a block is more robust than the MCS applied to symbols other than symbols at both end parts of the block, so that it is possible to increase a transmission data area and reduce degradation of received signal quality by IBI caused by setting the CP length to less than a multi-path maximum delay time, thereby maintaining the received signal quality and improving throughput.

Embodiment 2

The transmitting apparatus and the receiving apparatus according to Embodiment 2 of the present invention only differ in functions and have the same configurations as the transmitting apparatus and the receiving apparatus explained in Embodiment 1, and will be explained with reference to FIGS. 2 and 4. However, in the following explanations, the MCS/symbol number storage section and the MCS switching control section have the same functions in the transmitting apparatus and the receiving apparatus, and so, only the transmitting apparatus will be explained.

FIG. 8 shows an example of a table stored in MCS/symbol number storage section 101 of the transmitting apparatus according to Embodiment 2 of the present invention. As shown in this figure, the transmission MCS value 64QAM is associated with the first robust MCS value 32QAM and the second robust MCS value 16QAM. Furthermore, the transmission MCS value 16QAM is associated with the first robust MCS value 8PSK and the second robust MCS value QPSK. Furthermore, the transmission MCS value 8PSK is associated with the first robust MCS value QPSK and the second robust MCS value BPSK. Furthermore, the transmission MCS value BPSK is associated with the first robust MCS value BPSK and the second robust MCS value BPSK.

For all transmission MCS values, the number of first or second robust MCS value symbols is 8. In this way, the second robust MCS values are associated with the modulation schemes with M-ary numbers equal to or lower than the first robust MCS values, and the first robust MCS values are associated with the modulation schemes with M-ary numbers equal to or lower than the transmission MCS values. Incidentally, required SINRs for the respective modulation schemes shown in FIG. 8 have a relationship that 64QAM is greater than 32QAM, 32QAM is greater than 16QAM, 16QAM is greater than 8PSK, 8PSK is greater than QPSK, and QPSK is greater than BPSK.

Figure 9:
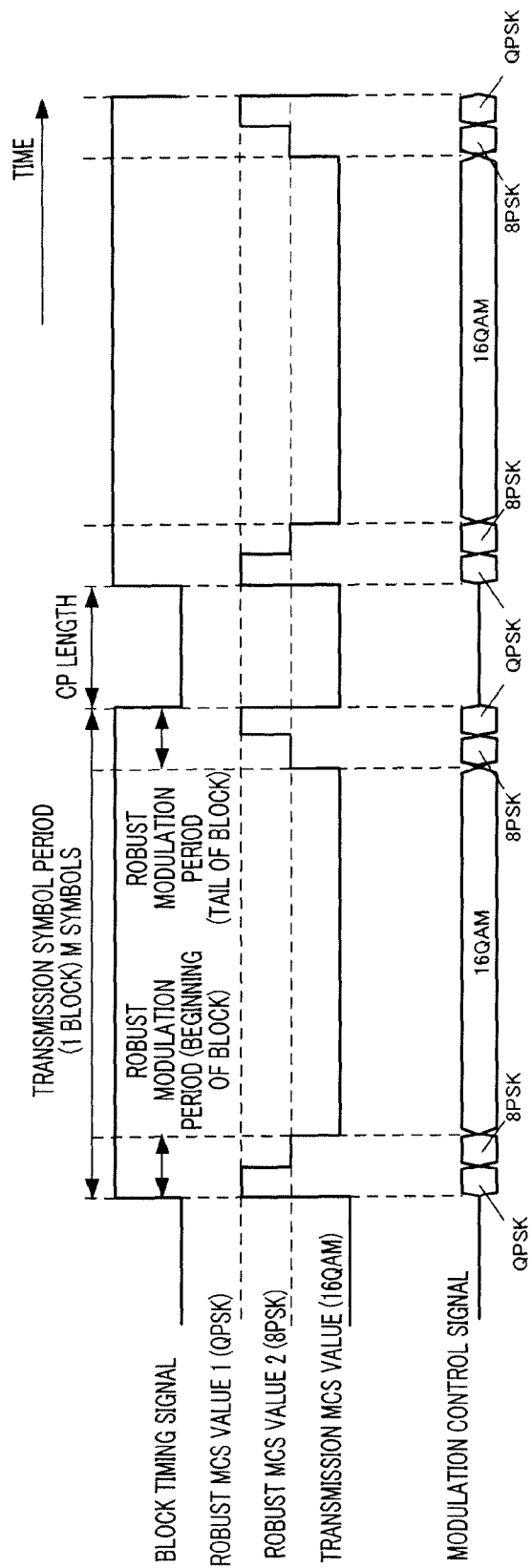
FIG. 9 is a timing chart showing a generating process of a modulation control signal when a transmission MCS value is 16QAM.

Next, the operations of MCS switching control section 102 according to Embodiment 2 of the present invention will be explained. FIG. 9 is a timing chart showing a generating process of a modulation control signal when the transmission MCS value is 16QAM. Here, the coding rate is set to an arbitrary fixed value.

The transmission MCS value outputted from the MAC section is 16QAM, and MCS switching control section 102 acquires first robust MCS value 8PSK, second robust MCS value QPSK and number of first and second robust MCS symbols 8 which correspond to the transmission MCS value of 16QAM from MCS/symbol number storage section 101. MCS switching control section 102 then generates a modulation control signal showing QPSK of the second robust MCS value with respect to the number of second robust MCS symbols from the time when the block timing signal rises, that is, 8 symbols from the beginning of the block. Then, MCS switching control section 102 generates a modulation control signal showing 8PSK of the first robust MCS value with respect to the number of first robust MCS symbols from the time when the time with respect to the number of second robust MCS symbols passes from the time when the block timing signal rises, that is, the 9th to 16th symbols from the beginning of the block.

Next, MCS switching control section 102 generates a modulation control signal showing 16QAM of the transmission MCS value with respect to the data part other than symbols at both ends to which the first and second robust MCS values are applied, and generates a modulation control signal showing first robust MCS value 8PSK with respect to the first robust MCS symbols from the time 16 symbols going back from the tail of the block towards the beginning of the block, that is, 8 symbols. Next, MCS switching control section 102 generates a modulation control signal showing second robust MCS value QPSK with respect to the second robust MCS symbols from the time 8 symbols going back from the tail of the block towards the beginning of the block, that is, 8 symbols.

The block timing signal falls during the period showing the CP length, and MCS switching control section 102 stops generating the modulation control signal during this period.

Figures 10, 11:
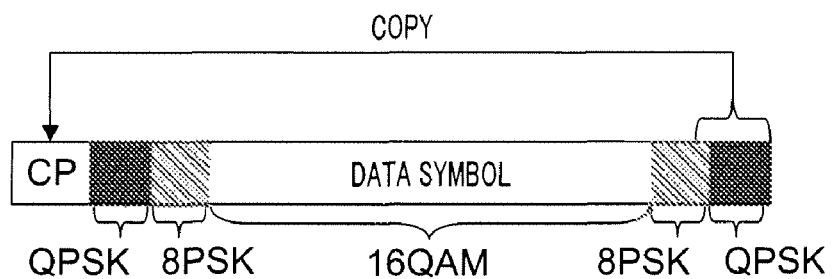
FIG. 10 illustrates transmission data generated by the transmitting apparatus according to Embodiment 2 of the present invention.
FIG. 11 shows an example of a table stored in the MCS/symbol number storage section of the transmitting apparatus according to Embodiment 3 of the present invention.

In this way, the transmission data as shown in FIG. 10 is generated. That is, the degree of degradation of received signal quality due to IBI increases as the distance from both ends of the block decreases, so that, throughput can be improved by applying a modulation scheme according to the degree of degradation of received signal quality.

In this way, according to Embodiment 2, the degree of degradation of received signal quality due to IBI increases as the distance from both ends of the block decreases and decreases as the distance from both ends increases, so that, by gradually applying a more robust MCS as the distance from both ends of the block decreases, it is possible to reduce degradation of received signal quality, and apply MCS with a higher transmission efficiency as the distance from both ends of the block increases, thereby improving throughput further.

Embodiment 3

The transmitting apparatus and the receiving apparatus according to Embodiment 3 of the present invention only differ in functions thereof and have similar configurations as the transmitting apparatus and receiving apparatus explained in Embodiment 1 only, this embodiment will be explained using FIGS. 2 and 4. However, in the following explanations, the MCS/symbol number storage section and MCS switching control section have the same functions in the transmitting apparatus and the receiving apparatus, and so only the transmitting apparatus will be explained.

FIG. 11 shows an example of a table stored in MCS/symbol number storage section 101 of the transmitting apparatus according to Embodiment 3 of the present invention. As shown in this figure, the transmission MCS value 64QAM is associated with the robust MCS value 16QAM and 32 symbols as the number of robust MCS symbols at the beginning and the tail, respectively. Furthermore, the transmission MCS value 16QAM is associated with the robust MCS value QPSK and 16 symbols as the number of robust MCS symbols at the beginning and the tail, respectively. Furthermore, the transmission MCS value 8PSK is associated with the robust MCS value BPSK and 8 symbols as the number of robust MCS symbols at the beginning and the tail, respectively. Furthermore, transmission MCS value QPSK is associated with robust MCS value BPSK and 4 symbols as the number of robust MCS symbols at the beginning and the tail, respectively.

In this way, the robust MCS values are associated with modulation schemes of lower M-ary numbers than the transmission MCS values, and greater number of symbols to which the robust MCS value is applied is set for transmission MCS values (e.g., 64QAM) having higher required quality and less number of symbols to which the robust MCS value is applied is set for transmission MCS values (e.g., QPSK) having lower required quality. The reason that the number of symbols is set as such will be explained below.

Figure 12A:
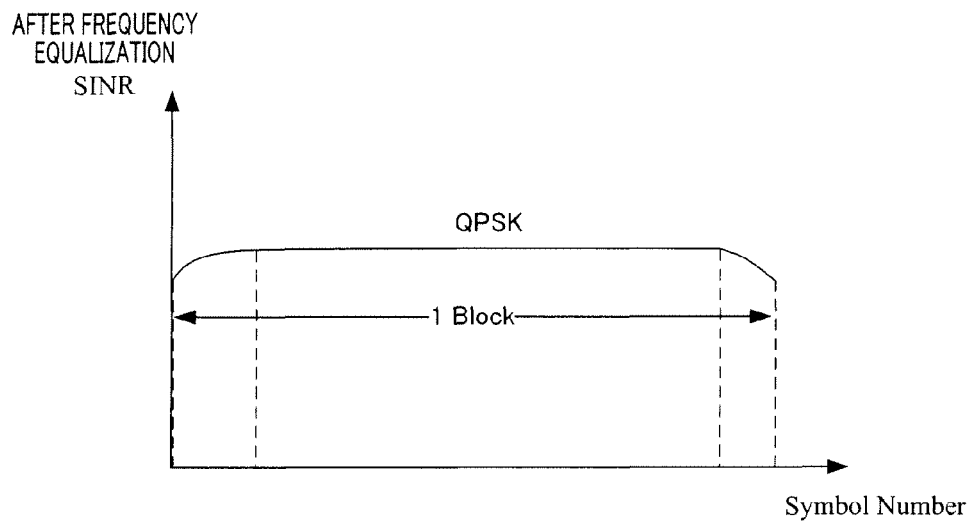
FIG. 12A shows an SINR for each symbol after frequency domain equalization of transmission MCS value QPSK.
Figure 12B:
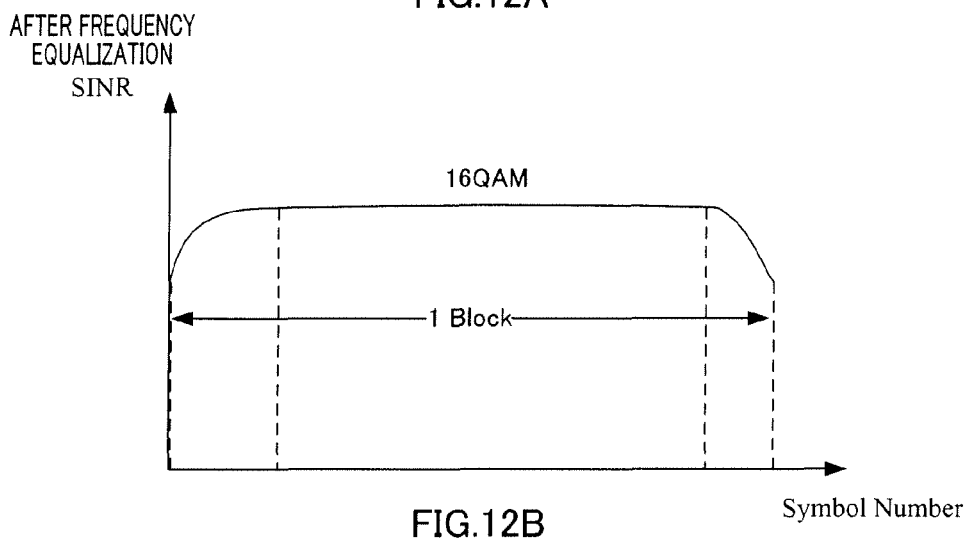
FIG. 12B shows an SINR for each symbol after frequency domain equalization of transmission MCS value 16QAM.
Figure 12C:
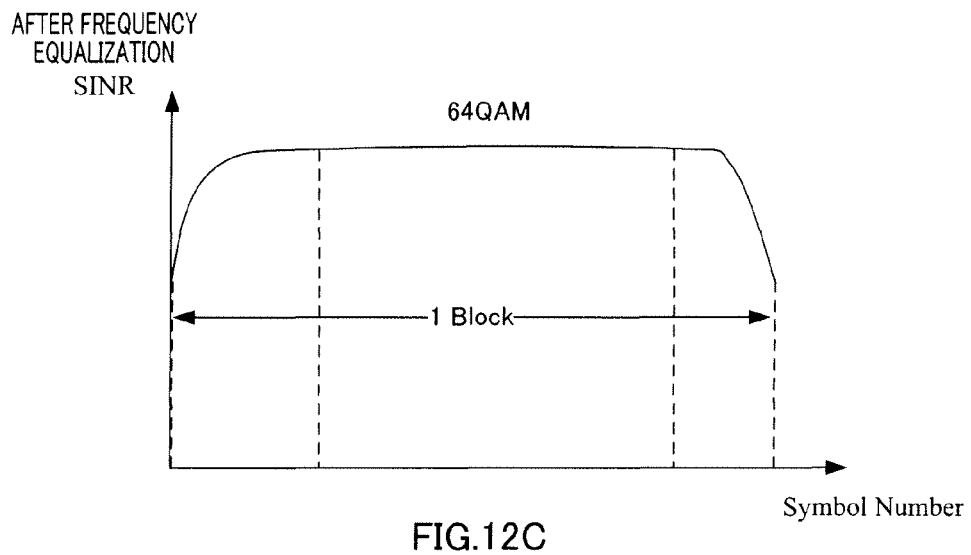
FIG. 12C shows an SINR for each symbol after frequency domain equalization of transmission MCS value 64QAM.

FIGS. 12A to C show an SINR for each symbol after frequency domain equalization of transmission MCS values (64QAM, 16QAM, and QPSK) of different required qualities when there is a delayed wave exceeding a CP. As shown in these figures, the number of symbols at both ends of a block where the SINR degrades varies depending on required quality to which the transmission MCS value is applied. That is, the transmission MCS value of high transmission efficiency (e.g., 64QAM) is applied to a case with a high SINR, and the amount of SINR degradation due to IBI is large and more symbols degrade. On the other hand, the transmission MCS value of low transmission efficiency (e.g., QPSK) is applied to a case with a low SINR, and the amount of SINR degradation due to IBI is small and fewer symbols degrade.

For such reasons, greater number of symbols to which a robust MCS value is applied is set for a transmission MCS value of higher required quality (e.g., 64QAM), and less number of symbols to which a robust MCS value is applied is set for a transmission MCS value of lower required quality (e.g., QPSK).

MCS switching control section 102 generates a modulation control signal at timing based on the number of robust MCS symbols at the beginning and the tail and a block timing signal and thereby generates transmission data as shown in FIG. 13A or FIG. 13B.

In this way, according to Embodiment 3, the number of symbols to which a robust MCS value is applied is made variable according to the transmission MCS value, and, even when the number of symbols receiving inter-block interference varies depending on the transmission MCS value, degradation of received signal quality of these symbols can be reduced, so that it is possible to improve throughput for each transmission MCS value.

Embodiment 4

The transmitting apparatus and the receiving apparatus according to Embodiment 4 of the present invention only differ in functions and have the same configurations as the transmitting apparatus and the receiving apparatus explained in Embodiment 1, and will be explained with reference to FIGS. 2 and 4. However, in the following explanations, the MCS/symbol number storage section and MCS switching control section have the same functions in the transmitting apparatus and the receiving apparatus, only the transmitting apparatus will be explained.

FIG. 14 shows an example of a table stored in MCS/symbol number storage section 101 of the transmitting apparatus according to Embodiment 4 of the present invention. As shown in this figure, transmission MCS value 64QAM, 16QAM, 8PSK and QPSK are associated with robust MCS value QPSK and 16 robust MCS symbols at the beginning and tail, respectively. In this way, transmission MCS values of higher required quality (e.g., 64QAM) are associated with robust MCS values of a larger required quality difference, and transmission MCS values of lower required quality (e.g., QPSK) are associated with MCS values of a smaller required quality difference.

Figure 15A:
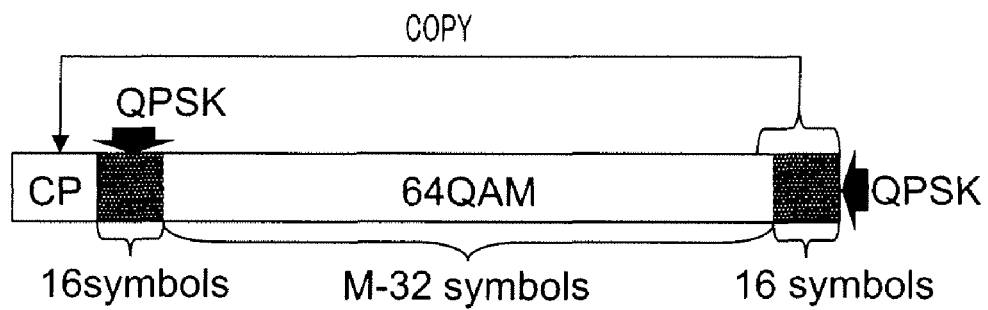
FIG. 15A illustrates transmission data generated by the transmitting apparatus according to Embodiment 4 of the present invention.
Figure 15B:
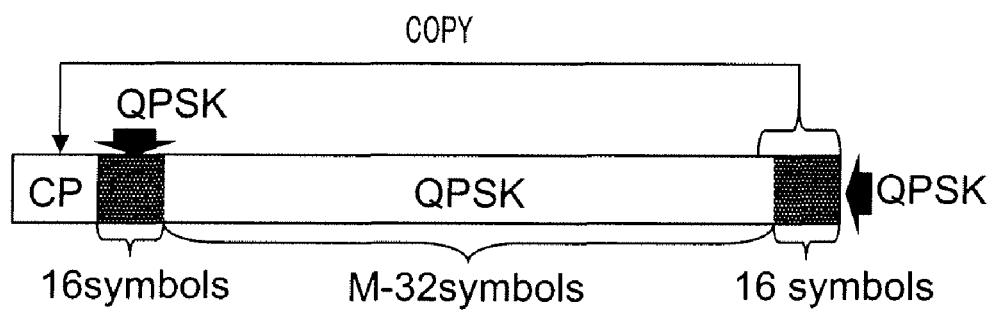
FIG. 15B illustrates transmission data generated by the transmitting apparatus according to Embodiment 4 of the present invention.

MCS switching control section 102 generates a modulation control signal at timing based on the number of robust MCS symbols at the beginning and the tail and a block timing signal and thereby generates transmission data as shown in FIG. 15A or FIG. 15B.

In this way, according to Embodiment 4, a transmission MCS value of higher required quality is more susceptible to IBI and a robust MCS value having a large required quality difference is applied to both ends of a block, and, a transmission MCS value of lower required quality is less susceptible to IBI, an MCS value having a small required quality difference is applied to both ends of the block, so that it is possible to improve throughput for each transmission MCS value.

As shown in FIG. 14, although cases have been explained with the present embodiment here where all robust MCS values corresponding to a transmission MCS value are QPSK, the present invention is not limited to this, and the combination between the transmission MSC value and robust MCS value may be, for example, 64QAM and 8PSK, 16QAM and QPSK, 8PSK and QPSK, QPSK and BPSK and the point is to apply a robust MCS value having a larger required quality difference to a transmission MCS value having higher required quality and apply an MCS value having a smaller required quality difference to a transmission MCS value of lower required quality.

However, when the present invention is assumed to be implemented on an actual machine, a robust MCS value is set among a little modulation schemes, and as a result, all robust MCS values corresponding to the transmission MCS value are actually estimated to be QPSK.

Embodiments of the present invention have been explained.

Although cases have been explained with the embodiments where symbols to which a robust MCS value is applied are set to the both end parts of a block, the present invention is not limited to this, and robust MCS may be applied to only the beginning part of the block or the tail part of the block. Furthermore, the number of symbols to which a robust MCS is applied may vary between the beginning part and the tail part of the block. Incidentally, the number of robust MCS symbols illustrated in the above described embodiments is only an example and it goes without saying that an optimum number of symbols should be set according to the CP length, error correcting performance or other elements.

Furthermore, although examples have been explained about modulation schemes as transmission MCS and robust MCS with the above described embodiments, the present invention is not limited to this, and, a coding rate may be used or a combination of a modulation scheme and a coding rate may also be used.

Moreover, although cases have been described with the embodiments above where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-347997, filed on Dec. 1, 2005, the entire content of which is expressly incorporated by reference herein.

INDUSTRIAL APPLICABILITY

The radio transmitting apparatus and the radio transmitting method according to the present invention can maintain received signal quality and improve throughput and are applicable to, for example, a radio communication base station apparatus and radio communication mobile station apparatus.

The invention claimed is:

1. A radio transmitting apparatus comprising:
a control section that controls, out of transmission data assigned in a block as a processing unit of time-frequency conversion, error robustness of transmission data assigned to an end part of the block by applying (1) a modulation scheme having lower required quality than a modulation scheme applied to transmission data assigned to a part other than the end part of the block, (2) a coding rate having lower required quality than a coding rate applied to the transmission data assigned to the part other than the end part of the block, or (3) a combination of a modulation scheme and a coding rate having lower required quality than a combination of a modulation scheme and a coding rate applied to the transmission data assigned to the part other than the end part of the block, to the transmission data assigned to the end part of the block; and
a transmission section that transmits the error robustness controlled transmission data in the block.

2. The radio transmitting apparatus according to claim 1, wherein the combination of the modulation scheme and the coding rate having the lower required quality is indicated by a modulation and coding scheme (MCS) parameter.

3. The radio transmitting apparatus according to claim 1, further comprising a CP attaching section that attaches a cyclic prefix generated by copying a tail part of the block to a length less than a delay time of a maximum delayed wave, to a beginning of the block.

4. The radio transmitting apparatus according to claim 1, wherein the control section applies a modulation and coding scheme parameter of lower required quality to transmission data assigned to a beginning part of the block or the transmission data assigned to the end part of the block.

5. The radio transmitting apparatus according to claim 1, wherein the control section applies a modulation and coding scheme parameter of lower required quality to transmission data assigned to both end parts of the block.

6. The radio transmitting apparatus according to claim 1, wherein the control section sets a modulation and coding scheme parameter applied to the transmission data assigned to the end part of the block to a modulation and coding scheme parameter associated in advance with a modulation and coding scheme parameter applied to the transmission data assigned to the part other than the end part of the block.

7. The radio transmitting apparatus according to claim 6, wherein the control section sets higher required quality of the modulation and coding scheme parameter applied to the transmission data assigned to the end part of the block when required quality of the modulation and coding scheme parameter applied to the transmission data assigned to the part other than the end part of the block becomes higher, and sets lower required quality of the modulation and coding scheme parameter applied to the transmission data assigned to the end part of the block when the required quality of the modulation and coding scheme parameter applied to the transmission data assigned to the part other than the end part of the block becomes lower.

8. The radio transmitting apparatus according to claim 1, wherein the control section applies a modulation and coding scheme parameter of lower required quality to transmission data closer to the end of the block, and applies a modulation and coding scheme parameter of higher required quality to transmission data farther from the end of the block.

9. The radio transmitting apparatus according to claim 1, wherein the control section sets a number of symbols of the transmission data assigned to the end part of the block to which a modulation and coding scheme parameter of lower required quality is applied, to a number of symbols corresponding to a modulation and coding scheme parameter applied to the transmission data assigned to the part other than the end part of the block.

10. The radio transmitting apparatus according to claim 9, wherein the control section sets a greater number of symbols when a required quality of the modulation and coding scheme parameter applied to the transmission data assigned to the part other than the end part of the block becomes higher, and sets a less number of symbols when the required quality of the modulation and coding scheme parameter applied to the transmission data assigned to the part other than the end part of the block becomes lower.

11. The radio transmitting apparatus according to claim 1, wherein the control section applies a modulation and coding scheme parameter having a larger difference from required quality to the transmission data assigned to the end part of the block when required quality of a modulation and coding scheme parameter applied to the transmission data assigned to the part other than the end part of the block becomes higher, and applies a modulation and coding scheme parameter having a smaller difference from the required quality to the transmission data assigned to the end part of the block when the required quality of the modulation and coding scheme parameter applied to the transmission data assigned to the part other than the end part of the block becomes lower.

12. The radio transmitting apparatus according to claim 1, wherein the time-frequency conversion is performed using a Fourier transform.

13. The radio transmitting apparatus according to claim 1, wherein the time-frequency conversion is performed using a multi-rate filter bank.

14. The radio transmitting apparatus according to claim 1, wherein the time-frequency conversion is performed using a wavelet transform.

15. A radio transmitting method performed by a radio transmitting apparatus, the radio transmitting method comprising:
   controlling, out of transmission data assigned in a block as a processing unit of time-frequency conversion, error robustness of transmission data assigned to an end part of the block by applying (1) a modulation scheme having lower required quality than a modulation scheme applied to transmission data assigned to a part other than the end part of the block, (2) a coding rate having lower required quality than a coding rate applied to the transmission data assigned to the part other than the end part of the block, or (3) a combination of a modulation scheme and a coding rate having lower required quality than a combination of a modulation scheme and a coding rate applied to the transmission data assigned to the part other than the end part of the block, to the transmission data assigned to the end part of the block; and
   transmitting the error robustness controlled transmission data within the block.

* * * * *